United States Patent
Li et al.

(10) Patent No.: US 11,758,167 B2
(45) Date of Patent: Sep. 12, 2023

(54) METHOD AND APPARATUS FOR VIDEO CODING

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/500,570

(22) Filed: Oct. 13, 2021

(65) Prior Publication Data

US 2022/0038728 A1  Feb. 3, 2022

Related U.S. Application Data

(63) Continuation of application No. 16/992,868, filed on Aug. 13, 2020, now Pat. No. 11,223,840.

(60) Provisional application No. 62/888,784, filed on Aug. 19, 2019.

(51) Int. Cl.
*H04N 7/12* (2006.01)
*H04N 19/44* (2014.01)
*H04N 19/105* (2014.01)
*H04N 19/132* (2014.01)
*H04N 19/176* (2014.01)
*H04N 19/186* (2014.01)
(Continued)

(52) U.S. Cl.
CPC .......... *H04N 19/44* (2014.11); *H04N 19/105* (2014.11); *H04N 19/132* (2014.11); *H04N 19/176* (2014.11); *H04N 19/186* (2014.11); *H04N 19/46* (2014.11); *H04N 19/513* (2014.11)

(58) Field of Classification Search
CPC .... H04N 19/44; H04N 19/105; H04N 19/132; H04N 19/176; H04N 19/186; H04N 19/46; H04N 19/513; H04N 19/70; H04N 19/52
USPC .................................................. 375/240.25
See application file for complete search history.

(56) References Cited

U.S. PATENT DOCUMENTS

| 11,470,304 B2 * | 10/2022 | Zhang ................. H04N 19/176 |
| 2020/0186820 A1 | 6/2020 | Park et al. |
| 2020/0186821 A1 | 6/2020 | Park et al. |

(Continued)

OTHER PUBLICATIONS

Benjamin Brass, et al, Versatile Video Coding (Draft 6), Jul. 3-12, 2019, 456 pages.

(Continued)

*Primary Examiner* — Gims S Philippe
(74) *Attorney, Agent, or Firm* — ARENTFOX SCHIFF LLP

(57) ABSTRACT

Aspects of the disclosure provide a method and an apparatus for video coding. The apparatus includes processing circuitry. The processing circuitry can determine a subblock-based merge mode used to code a current block in a current picture. The processing circuitry can partition the current block into a plurality of subblocks based on the subblock-based merge mode. The processing circuitry can determine that decoder-side motion vector refinement (DMVR) is to be applied to one of the plurality of subblocks in the current block based on a mode type of the subblock-based merge mode. The processing circuitry can encode information indicating the subblock-based merge mode in a bitstream.

14 Claims, 17 Drawing Sheets

(51) Int. Cl.
*H04N 19/46* (2014.01)
*H04N 19/513* (2014.01)

(56) References Cited

U.S. PATENT DOCUMENTS

| | | |
|---|---|---|
| 2020/0236391 A1 | 7/2020 | Lee et al. |
| 2020/0314445 A1* | 10/2020 | Park .................. H04N 19/52 |
| 2020/0389656 A1* | 12/2020 | Huang ............. H04N 19/513 |
| 2021/0037238 A1 | 2/2021 | Park et al. |
| 2021/0051329 A1 | 2/2021 | Ko et al. |
| 2021/0321089 A1* | 10/2021 | Lin .................. H04N 19/176 |
| 2021/0368180 A1* | 11/2021 | Park .................. H04N 19/52 |
| 2022/0030266 A1* | 1/2022 | Park ................ H04N 19/105 |
| 2022/0116643 A1* | 4/2022 | Chen ................. H04N 19/44 |
| 2022/0224911 A1* | 7/2022 | Park .................. H04N 19/70 |

OTHER PUBLICATIONS

International Telecommunication Union (ITU-T) Telecommunication Standardization Sector of ITU, "High Efficiency Video Coding", Series H: Audiovisual and Multimedia Systems Infrastructure of Audiovisual Services—Coding of Moving Video, Dec. 2016 (664 pages).

* cited by examiner

Table 1: Exemplary BDOF conditions

- sps_bdof_enabled_flag is equal to 1 and slice_disable_bdof_dmvr_flag is equal to 0.
- predFlagL0 and predFlagL1 are both equal to 1, which means the block is coded using bi-prediction mode.
- DiffPicOrderCnt( currPic, RefPicList[ 0 ][ refIdxL0 ] ) * DiffPicOrderCnt( currPic, RefPicList[ 1 ][ refIdxL1 ] ) is less than 0, which means one of the two reference pictures is prior to the current picture in display order and the other is after the current picture in display order.
- MotionModelIdc is equal to 0, which means translation motion
- merge_subblock_flag is equal to 0, which means current block is not oded using any subblock merge mode (including affine merge mode and SbTMVP mode)
- sym_mvd_flag is equal to 0, which means symmetrical MVD mode is not used
- CIIP mode is not used
- BcwIdx is equal to 0, which means equal weighting is used for BCW
- luma_weight_l0_flag[ refIdxL0 ] and luma_weight_l1_flag[ refIdxL1 ] are both equal to 0, which indicates equal weighting is used for Luma weigthed prediction.
- cbWidth (coding block width) is greater than or equal to 8.
- cbHeight (coding block height) is greater than or equal to 8.
- cbHeight * cbWidth is greater than or equal to 128.
- For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.
- cIdx is equal to 0, which means the color component is Luma

*FIG. 11*

Table 2: Exemplary DMVR conditions

- MergeGpmFlag is equal to 0 (Geometric partitioning mode is not used)    1210
- Inter_affine_flag is equal to 0 (inter affine prediction is not used)
- Merge_subblock_flag is equal to 0 (subblock based merge mode is not used)
- sps_dmvr_enabled_flag is equal to 1 and slice_disable_bdof_dmvr_flag is equal to 0
- general_merge_flag is equal to 1
- both predFlagL0 and predFlagL1 are equal to 1, which means the block is coded using bi-prediction mode.
- mmvd_flag is equal to 0, which indicats MMVD mode is not used
- BCW weight index indicates equal weight
- luma_weight_l0_flag[ refIdxL0 ] and luma_weight_l1_flag[ refIdxL1 ] are equal to 0, which indicates equal weighting is used for bi-prediction
- DiffPicOrderCnt( currPic, RefPicList[ 0 ][ refIdxL0 ]) is equal to DiffPicOrderCnt( RefPicList[ 1 ][ refIdxL1 ], currPic ), which means the distances from both reference pictures to the current picture are same
- cbWidth (coding block width) is greater than or equal to 8.
- cbHeight (coding block height) is greater than or equal to 8.
- cbHeight*cbWidth is greater than or equal to 128
- For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

*FIG. 12*

Table 3: Exemplary DMVR conditions

- MergeGpmFlag is equal to 0 (Geometric partitioning mode is not used)   1310
- Inter_affine_flag is equal to 0 (inter affine prediction is not used)
- Affine merge mode is not used ~~Merge_subblock_flag is equal to 0 (subblock based merge mode is not used)~~
- sps_dmvr_enabled_flag is equal to 1 and slice_disable_bdof_dmvr_flag is equal to 0
- general_merge_flag is equal to 1
- both predFlagL0 and predFlagL1 are equal to 1, which means the block is coded using bi-prediction mode.
- mmvd_flag is equal to 0, which indicats MMVD mode is not used
- BCW weight index indicates equal weight
- luma_weight_l0_flag[ refIdxL0 ] and luma_weight_l1_flag[ refIdxL1 ] are equal to 0, which indicates equal weighting is used for bi-prediction
- DiffPicOrderCnt( currPic, RefPicList[ 0 ][ refIdxL0 ]) is equal to DiffPicOrderCnt( RefPicList[ 1 ][ refIdxL1 ], currPic ), which means the distances from both reference pictures to the current picture are same   1320
- cbWidth (coding block width) is greater than or equal to 8.
- cbHeight (coding block height) is greater than or equal to 8.
- cbHeight*cbWidth is greater than or equal to 128   1330
- For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

*FIG. 13*

Table 4: Exemplary DMVR conditions

- MergeGpmFlag is equal to 0 (Geometric partitioning mode is not used)
- Inter_affine_flag is equal to 0 (inter affine prediction is not used)
- Affine merge mode is not used
- sps_dmvr_enabled_flag is equal to 1 and slice_disable_bdof_dmvr_flag is equal to 0
- general_merge_flag is equal to 1
- both predFlagL0 and predFlagL1 are equal to 1, which means the block is coded using bi-prediction mode.
- mmvd_flag is equal to 0, which indicats MMVD mode is not used
- BCW weight index indicates equal weight
- luma_weight_l0_flag[ refIdxL0 ] and luma_weight_l1_flag[ refIdxL1 ] are equal to 0, which indicates equal weighting is used for bi-prediction
- DiffPicOrderCnt( currPic, RefPicList[ 0 ][ refIdxL0 ]) is equal to DiffPicOrderCnt( RefPicList[ 1 ][ refIdxL1 ], currPic ), which means the distances from both reference pictures to the current picture are same
- sub-block-width is greater than or equal to 8.
- sub-block-height is greater than or equal to 8.
- sub-block-width * sub-block-height is greater than or equal to 64

METHOD AND APPARATUS FOR VIDEO CODING

CROSS REFERENCE TO RELATED APPLICATIONS

The present application is a continuation of U.S. application Ser. No. 16/992,868, filed on Aug. 13, 2020, which claims the benefit of priority to U.S. Provisional Application No. 62/888,784, "Motion Refinement on Subblock Inter Prediction" filed on Aug. 19, 2019, the contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide a method and an apparatus for video encoding/decoding. In some examples, an apparatus for video decoding includes processing circuitry. The processing circuitry can decode prediction information of a current block in a current picture from a coded video bitstream. The prediction information can indicate a sub-block-based merge mode for a plurality of subblocks in the current block. The processing circuitry can determine whether to apply decoder-side motion vector refinement (DMVR) to one of the plurality of subblocks based on at least a mode type of the subblock-based merge mode. In response to the DMVR being determined to be applied to the one of the plurality of subblocks, the processing circuitry can reconstruct the one of the plurality of subblocks according to the subblock-based merge mode with the DMVR.

In an embodiment, the processing circuitry can determine to apply the DMVR to the one of the plurality of subblocks based on the mode type of the subblock-based merge mode not being affine merge mode.

In an embodiment, the processing circuitry can determine to apply the DMVR to the one of the plurality of subblocks based at least in part on the subblock-based merge mode being subblock-based temporal motion vector prediction (SbTMVP).

In an embodiment, the processing circuitry can determine to apply the DMVR to the one of the plurality of subblocks based at least in part on the subblock-based merge mode being SbTMVP and a subblock size of each of the plurality of subblocks being 16×16 luma samples.

In an example, the processing circuitry can determine whether one or more reference picture lists for the current block satisfy a plurality of conditions. The plurality of conditions can include that (a) the one or more reference picture lists for the current block include a first reference picture list and a second reference picture list, (b) the current picture is between a first reference picture in the first reference picture list and a second reference picture in the second reference picture list in a video sequence, and (c) a first temporal distance between the first reference picture and the current picture is equal to a second temporal distance between the second reference picture and the current picture. The processing circuitry can determine not to apply the DMVR to the one of the plurality of subblocks based on the one or more reference picture lists for the current block not satisfying the plurality of conditions. The processing circuitry can determine to apply the DMVR to the one of the plurality of subblocks based at least in part on the one or more reference picture lists for the current block satisfying the plurality of conditions.

In an example, the one or more reference picture lists for the current block satisfy the plurality of conditions and a subblock size of each of the plurality of subblocks is 16×16 luma samples.

In an example, the one or more reference picture lists for the current block satisfy the plurality of conditions. The prediction information further includes a flag that indicates whether a subblock size of each of the plurality of subblocks is 16×16 luma samples. The processing circuitry can determine to apply the DMVR to the one of the plurality of subblocks based at least in part on the flag indicating that the subblock size is 16×16 luma samples.

In an example, a subblock merge candidate list includes a SbTMVP candidate with the DMVR enabled.

In an embodiment, the processing circuitry can determine to apply the DMVR to the one of the plurality of subblocks based at least in part on a subblock size of each of the plurality of subblocks being 8×8 luma samples.

In an embodiment, the prediction information further includes a high level flag indicating whether the DMVR is allowed for a plurality of blocks that includes the current block. The processing circuitry can determine whether to apply the DMVR to the one of the plurality of subblocks based on the high level flag.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 11 shows an exemplary set of conditions for applying the BDOF in accordance with one embodiment.

FIG. 12 shows an exemplary set of block-level DMVR conditions in accordance with one embodiment.

FIG. 13 shows an exemplary set of block-level DMVR conditions in accordance with one embodiment.

FIG. 14 shows an exemplary set of subblock-level DMVR conditions in accordance with one embodiment

DETAILED DESCRIPTION OF EMBODIMENTS

Figure 1:
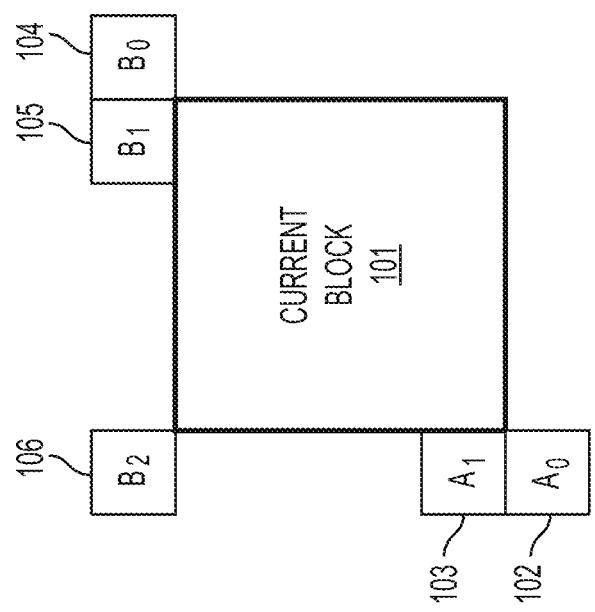
FIG. 1 is a schematic illustration of a current block and its surrounding spatial merge candidates in one example.
Figure 2:
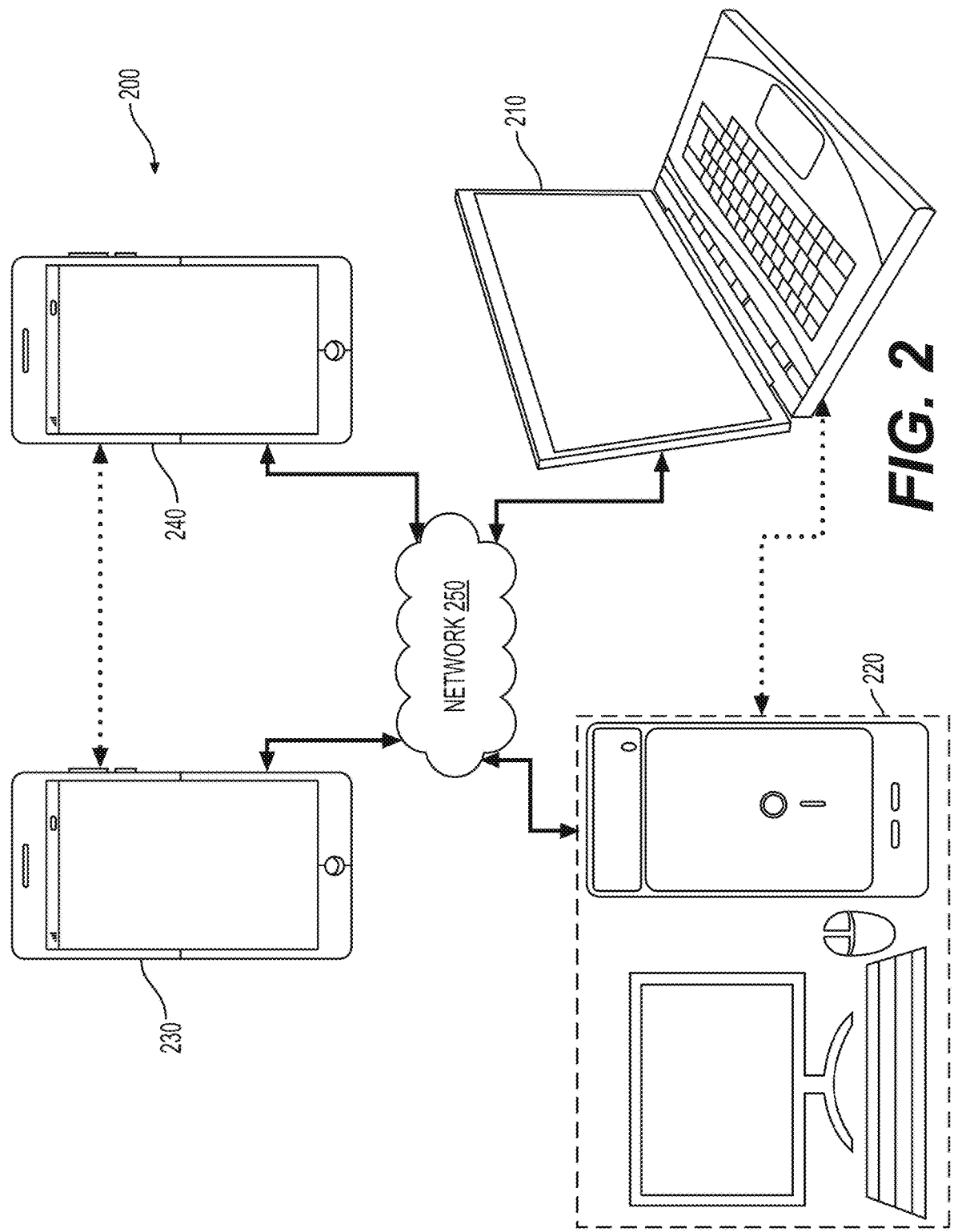
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240)

via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
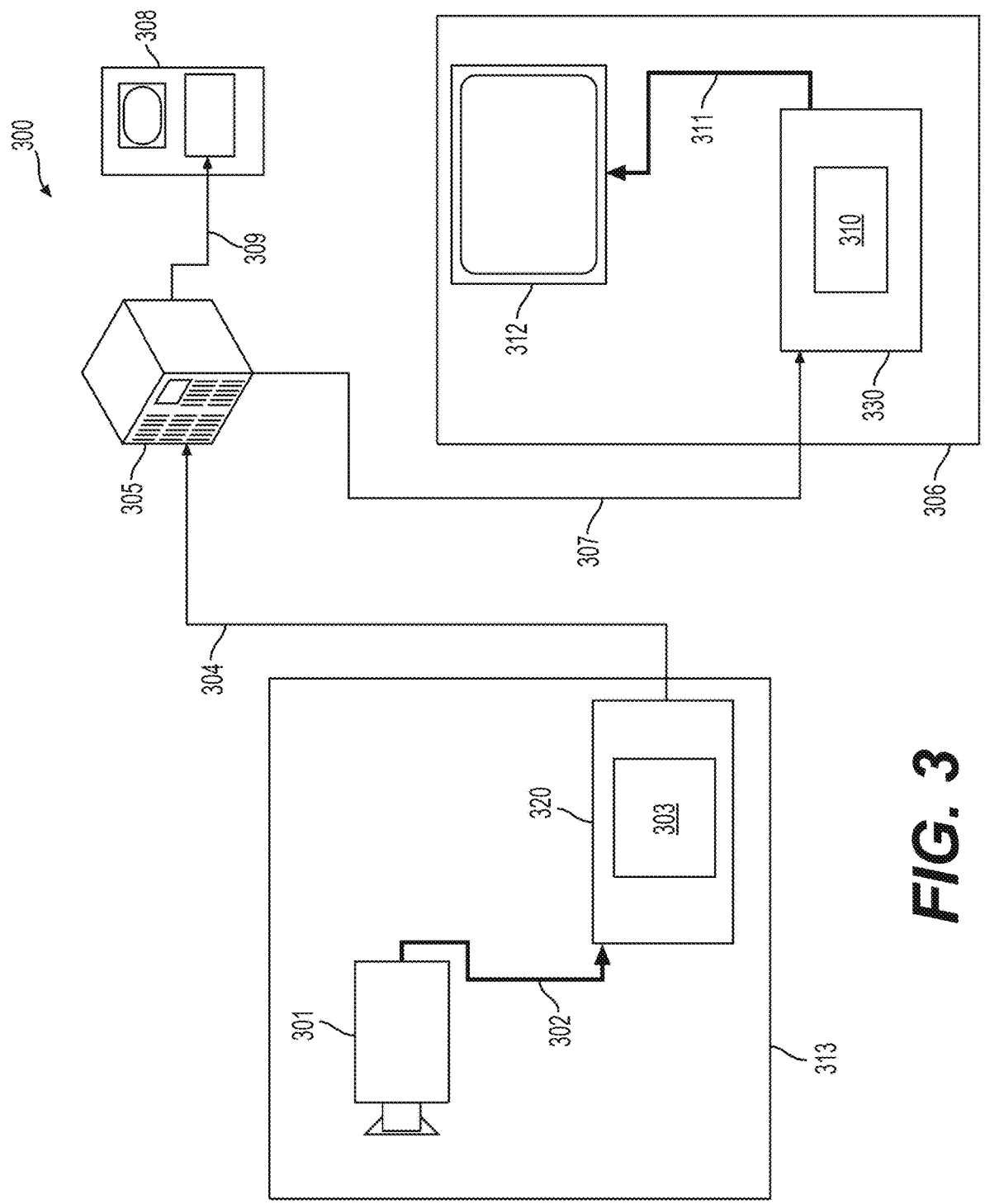
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
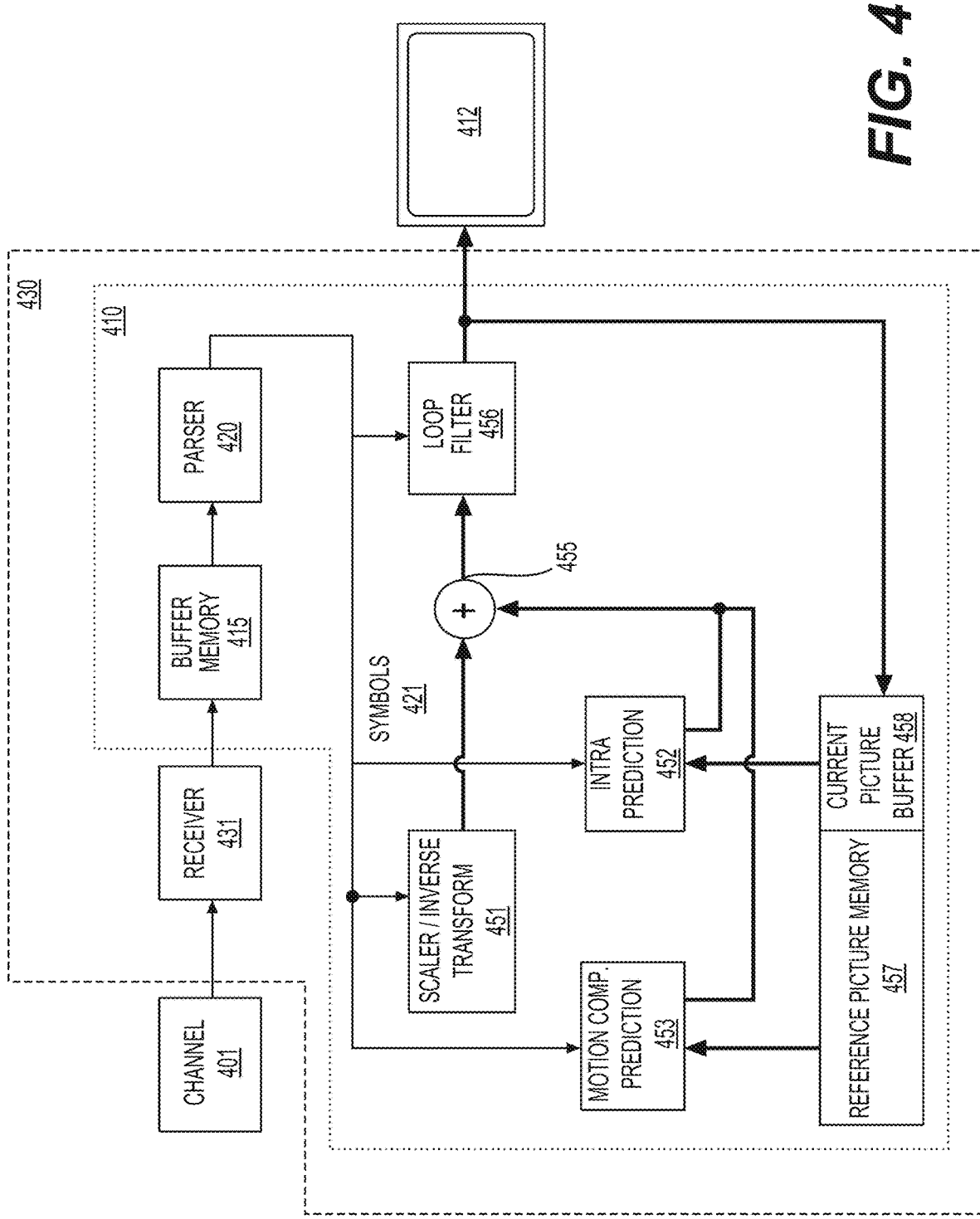
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
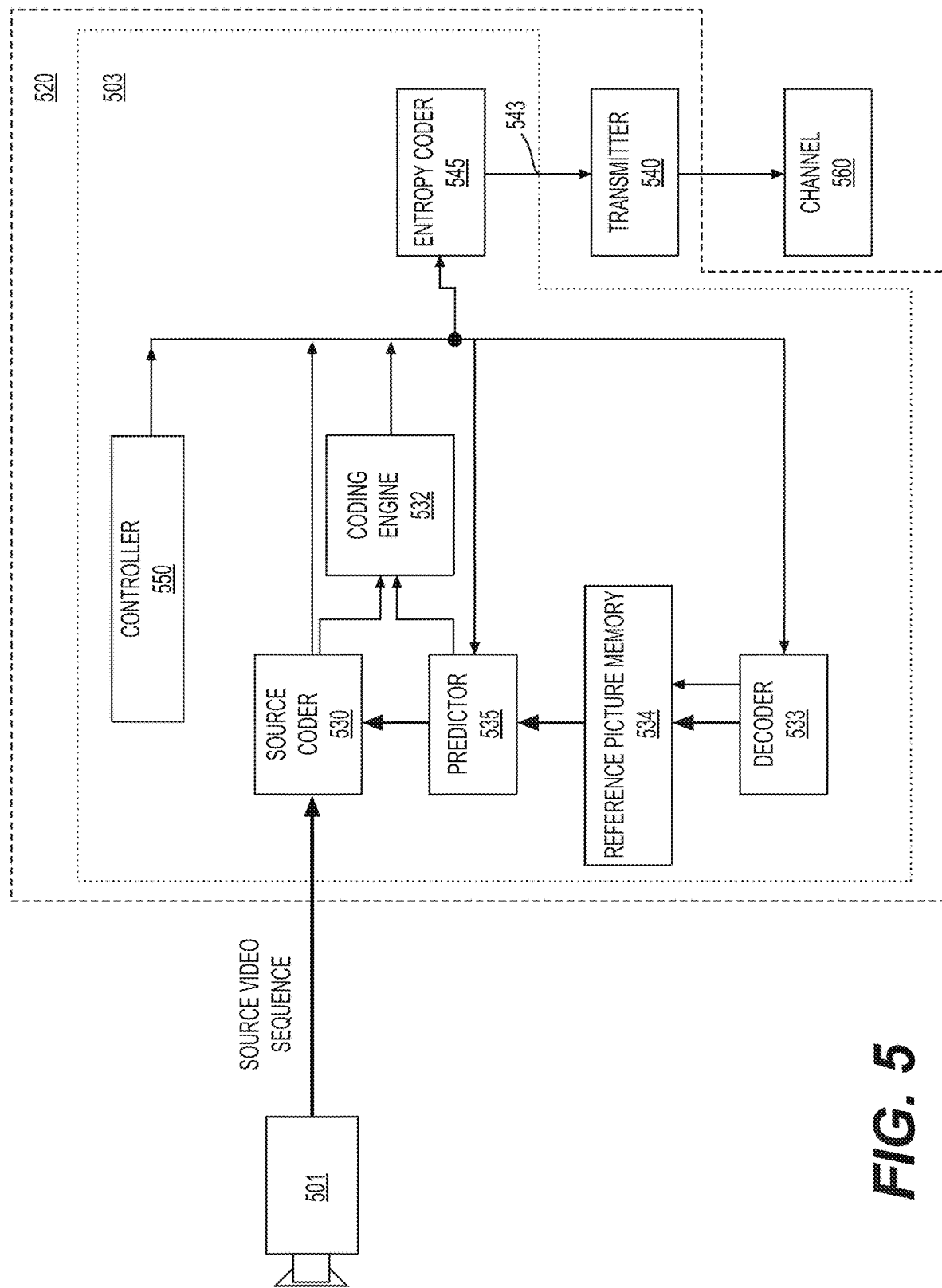
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
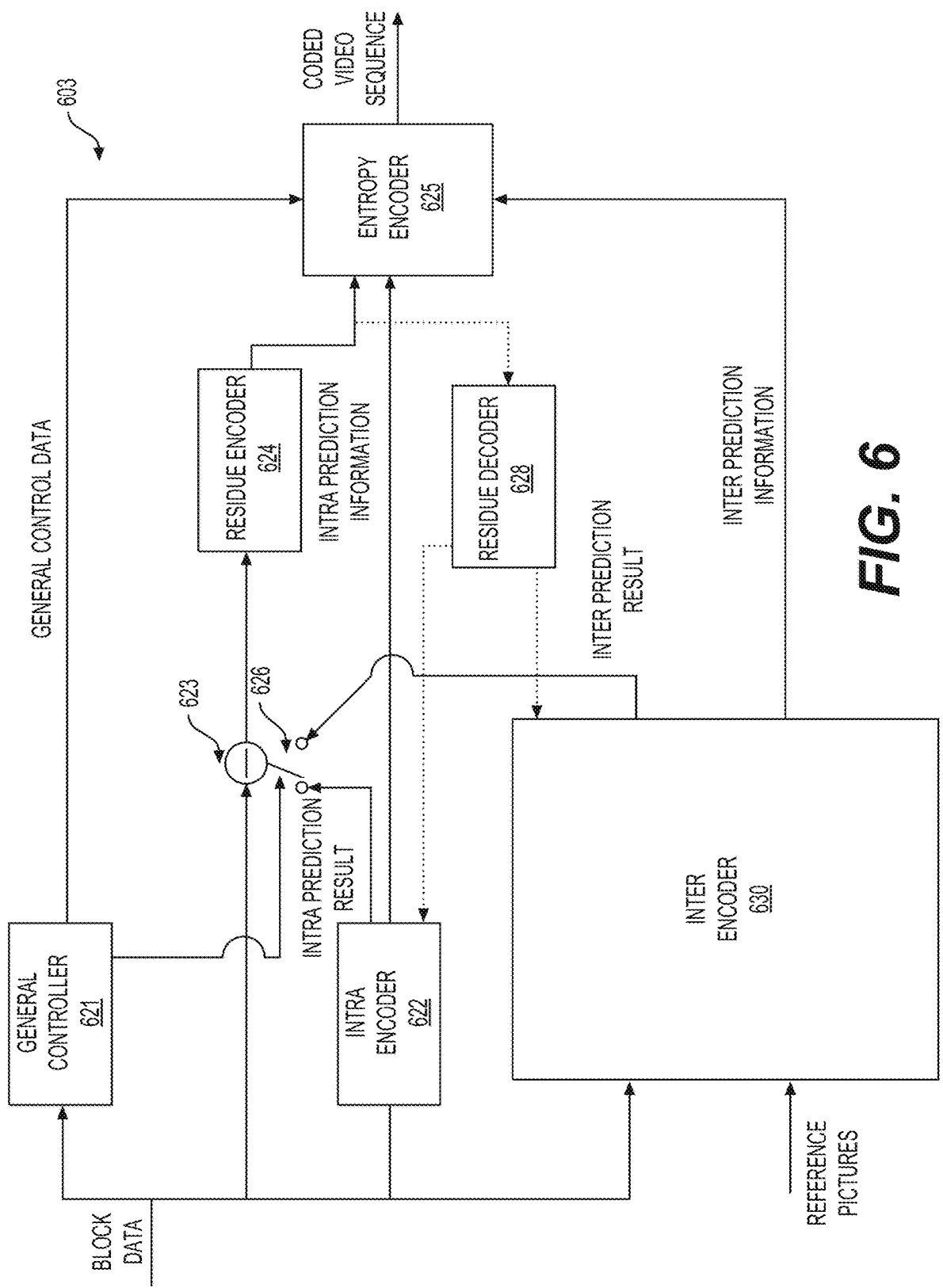
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
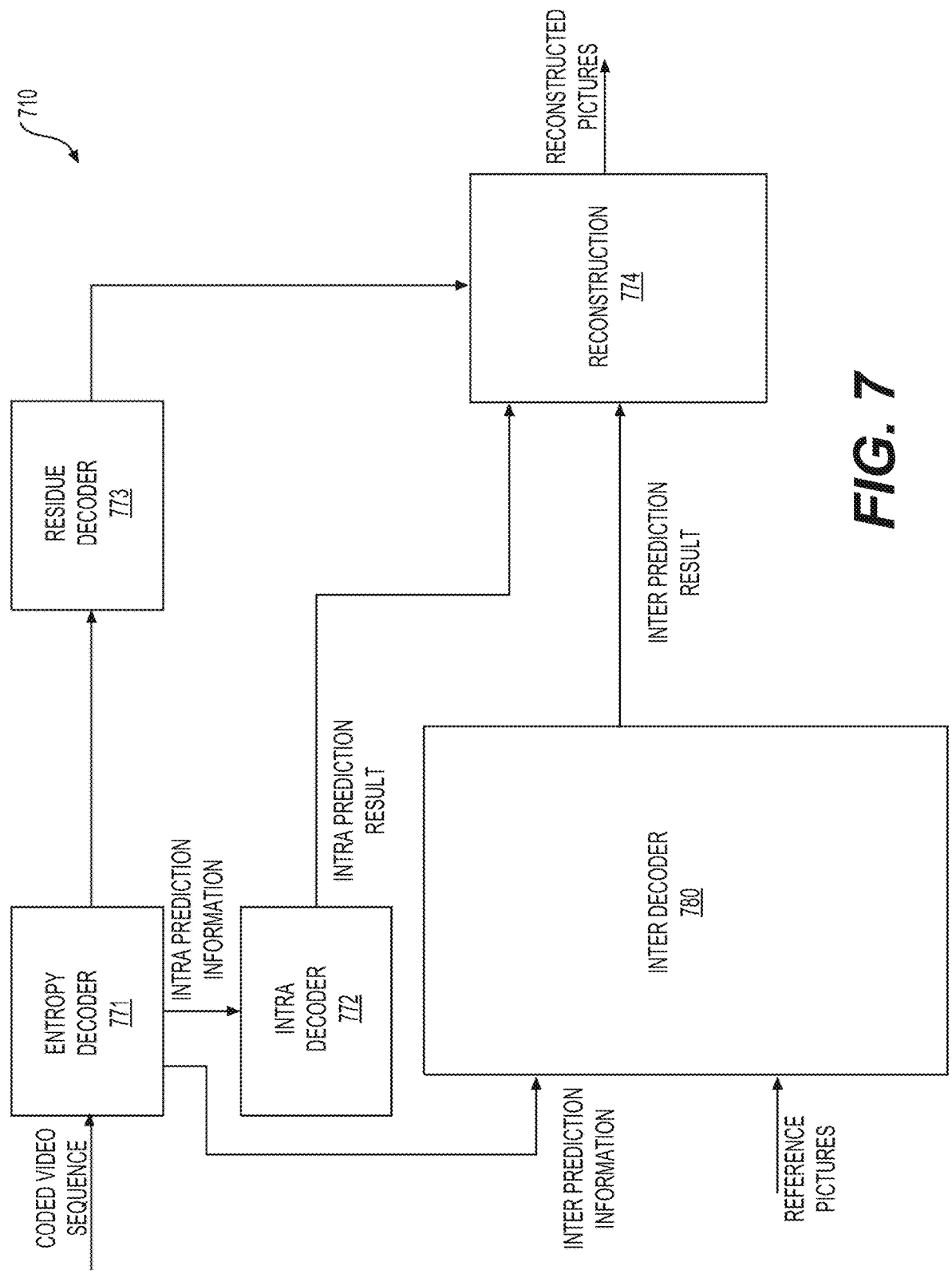
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are related to inter-prediction in video coding, such as methods of applying the DMVR to subblock-based inter prediction.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0), a second reference picture list or a list 1 (L1)) can be used. In bi-prediction, both L0 and L1 can be used. The reference picture list usage index can indicate that the reference picture list(s) include L0, L1, or L0 and L1.

The motion parameters can be signaled in an explicit or implicit manner. When a CU is coded with a skip mode, the CU can be associated with one PU and can have no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some examples, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) bi-prediction with weighted averaging (BWA), (8) bi-directional optical flow (BDOF), (9) decoder-side motion vector refinement (DMVR), (10) triangle partition prediction, and (11) combined inter and intra prediction (CIIP).

In an embodiment, a subblock-based temporal motion vector prediction (SbTMVP) method can be used in video coding. Similar to a temporal motion vector prediction (TMVP) (e.g., used in HEVC), the SbTMVP can use a motion field in a collocated picture to improve MVP and merge mode for CUs in a current picture. A collocated picture used in the TMVP can be used for the SbTMVP.

The SbTMVP can differ from the TMVP in the following aspects. (i) TMVP can predict motion information (e.g., a MV) at a CU level (e.g., a CB level, a block level), and the SbTMVP can predict motion information (e.g., a MV) at a sub-CU level (e.g., a sub-CB level, a subblock level). (ii) The TMVP can obtain temporal motion information (e.g., temporal MVs) from a collocated block in the collocated picture (e.g., the collocated block is the bottom-right or center block relative to the current CU). The SbTMVP can apply a motion shift before obtaining the temporal motion information from the collocated picture where the motion shift can be obtained from a MV from one of the spatial neighboring blocks of the current CU.

Figure 8A:
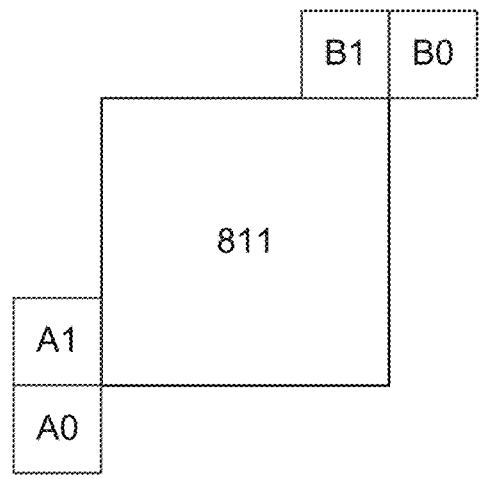
FIGS. 8A-8C show an example of a subblock-based temporal motion vector prediction (SbTMVP) method in accordance with one embodiment.
Figure 8B:
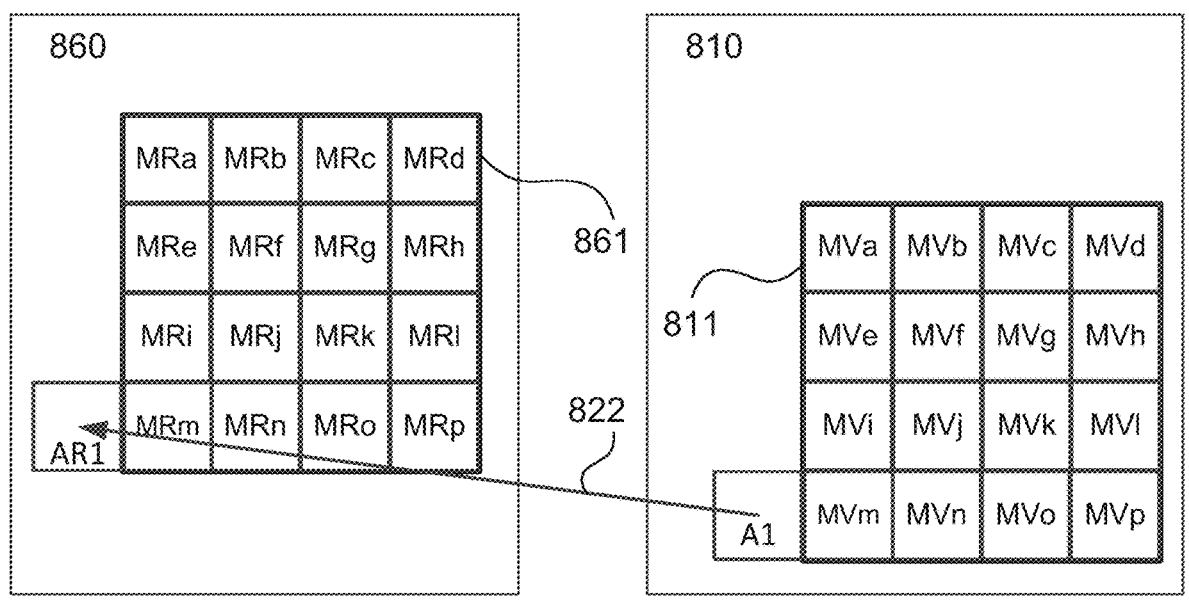
Figure 8C:
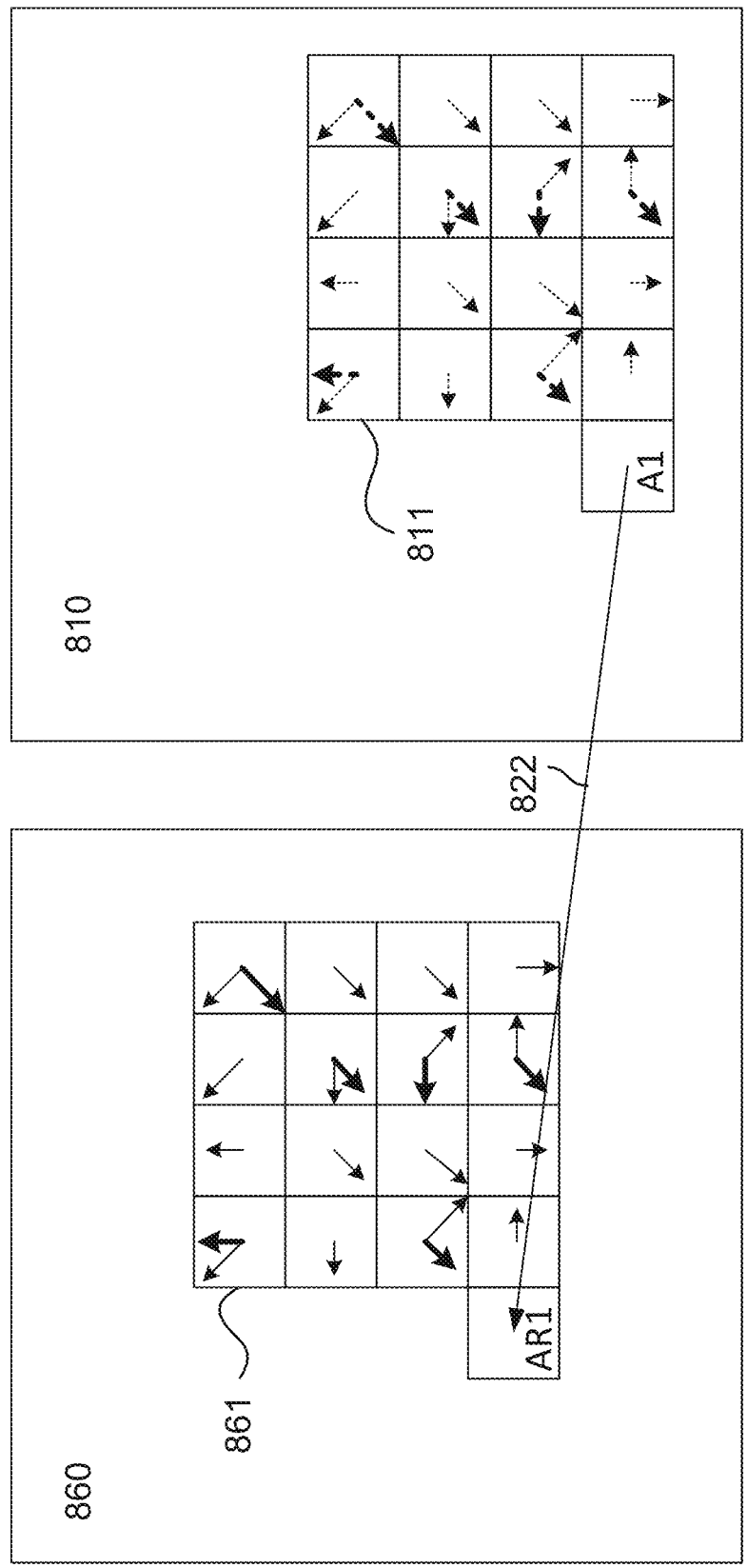

FIGS. 8A-8C show an example of a SbTMVP method in accordance with one embodiment. FIG. 8A shows a current CU (811) and spatial neighboring blocks A0, A1, B0, and B1 of the current CU (811). In some examples, spatial neighboring blocks (or spatial neighbors) A0, A1, B0, and B1 and the current CU (811) are in a current picture (810). In an example, the current picture (810) corresponds to a collocated picture (860).

Referring to FIGS. 8A-8B, the SbTMVP can predict MVs of the sub-CUs in the current CU (811) in two steps. In a first step, in an example, the spatial neighboring block A1 is checked. If the spatial neighboring block A1 has a MV (e.g., MV (822)) that uses the collocated picture (860) of the current picture (810) as a reference picture, the MV (822) can be used for performing the motion shift. In an example, the spatial neighboring blocks A1, B1, B0, and A0 can be sequentially checked. As soon as a first spatial neighboring block (e.g., A1) that has a MV (e.g., the MV (822)) that uses the collocated picture (860) of the current picture (810) as a reference picture is identified, the MV (822) can be used for performing the motion shift. In an example, the MV (822) points to a reference block AR1 in the reference picture (860). If no such MV is available, for example, from the spatial neighboring blocks A1, B1, B0, and A0, the motion shift can be set to (0, 0).

In a second step, the motion shift (e.g., the MV (822)) identified in the first step can be applied (e.g., the motion shift can be added to coordinates of the current CU (811)) to obtain sub-CU level motion information (e.g., MVs and corresponding reference indices) from the collocated picture (860) as shown in FIG. 8B. Referring to FIG. 8B, the motion shift can be set to be the MV (822) of A1. Thus, for each sub-CU in the current CU (811), the motion information (also referred to as reference motion information) of a corresponding block (e.g., a smallest motion grid that covers a center sample) in the collocated picture (860) can be used to derive the motion information for the sub-CU in the current CU (811). After the reference motion information (e.g., MRa) of the collocated sub-CU is identified, the reference motion information (e.g., MRa) can be converted to the motion information (e.g., MVa including the motion vectors and reference indices) of the current sub-CU, for example, in a similar way as the TMVP process of HEVC, where a temporal motion scaling can be applied to align the reference pictures of the temporal motion vectors to those of the current CU (811).

In FIG. 8B, a reference CU (861) in the collocated picture (860) can include 16 sub-CUs with reference motion information MRa-MRp. Each of the 16 sub-CUs in the reference CU (861) can correspond to a smallest motion grid that covers a center sample of the sub-CU. The reference motion information can include motion vectors and corresponding reference indices. The current CU (811) can include 16 sub-CUs, and the motion information MVa-MVp for the sub-CUs in the current CU (811) can be derived based on the respective reference motion information MRa-MRp in a manner similar to the TMVP process, with temporal scaling in some examples.

FIG. 8C shows examples of the reference motion information MRa-MRp and the motion information MVa-MVp according to an embodiment of the disclosure. The reference motion information MRa-MRp can include motion information based on L0 and/or L1. The motion information MVa-MVp can include motion information based on L0 and/or L1. In the co-located picture (860), the reference motion information (e.g., MRa, MRd, MRg, MRi, MRk, and MRo) can be based on L1 (e.g., bolded arrow) and L0 (non-bolded arrows). The remaining reference motion information (e.g., MRb and the like) can be based on L0 (non-bolded arrows). Accordingly, in the current picture (810), the motion information (e.g., MVa, MVd, MVg, MVi, MVk, and MVo) can be based on L1 (e.g., bolded arrow with dash) and L0 (non-bolded arrows with dash). The remaining motion information (e.g., MVb and the like) can be based on L0 (non-bolded arrows with dash)

The sub-CU size used in the SbTMVP process can be fixed (or otherwise predetermined, e.g., 8×8 samples) or signaled. In some examples, the SbTMVP process is only applicable to a CU (e.g., a block, a coding block) with a width and a height equal to or greater than 8 samples.

In an example, a combined subblock based merge list that includes a SbTMVP candidate and affine merge candidates is used for the signaling of a subblock based merge mode. The SbTMVP mode can be enabled or disabled by a sequence parameter set (SPS) flag. In some examples, if the SbTMVP mode is enabled, the SbTMVP candidate (also referred to as SbTMVP predictor) is added as a first entry of a list of subblock based merge candidates (e.g., the combined subblock based merge list), and followed by one or more affine merge candidates. In some embodiments, a size of the subblock based merge list is signaled in the SPS and a maximum allowed size of the subblock based merge list is set to five. However, other sizes may be utilized in other embodiments.

In some embodiments, the encoding logic of an additional SbTMVP merge candidate is the same as for the other merge candidates. For example, for each CU in a P slice or a B slice, an additional rate-distortion check can be performed to determine whether to use the SbTMVP candidate.

According to some aspects of the disclosure, a motion refinement technique that is referred to as bi-directional optical flow (BDOF) mode is used in inter prediction. BDOF is also referred to as BIO in some examples. BDOF can be used to refine a bi-prediction signal of a CU at a 4×4 subblock level. BDOF can be applied to a CU when the CU satisfies certain conditions. In an example, the conditions include: (i) the CU's height is not 4, and the CU size is not 4×8, (ii) the CU is not coded using affine mode or the ATMVP merge mode, (iii) the CU is coded using a "true" bi-prediction mode, e.g., one of the two reference pictures is prior to the current picture in a display order and the other is after the current picture in the display order. BDOF is only applied to a luma component in some examples. In an example, the conditions include: (i) the CU is coded using the "true" bi-prediction mode, e.g., one of the two reference pictures is prior to the current picture in a display order and the other is after the current picture in the display order, (ii) the distances (i.e., POC differences) from the two reference pictures to the current picture are identical, (iii) the two reference pictures are short-term reference pictures, (iv) the CU is not coded using affine mode or the ATMVP merge mode, (v) the CU has more than 64 luma samples, (vi) a CU height and a CU width are larger than or equal to 8 luma samples, (vii) a bi-prediction with CU weight (BCW) index indicates an equal weight, (viii) a weighted prediction (WP) is not enabled for the current CU, and (ix) a CIIP mode is not used for the current CU.

In an embodiment, the BDOF mode is only applied to a luma component. The motion refinement in the BDOF mode is based on the optical flow concept, which assumes that the motion of an object is smooth. For each 4×4 subblock (e.g., a subblock (920) in a CU (910) in FIG. 9), a motion refinement ($\Delta mv_x$, $\Delta mv_y$) is calculated by minimizing a difference between the L0 and L1 prediction samples. The motion refinement is then used to adjust the bi-predicted sample values in the 4×4 sub-block (e.g., the subblock (920)). The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals are computed by directly calculating the difference between two neighboring samples, e.g., $$\frac{\partial I^{(k)}}{\partial x}(i, j) = \left(I^{(k)}(i+1, j) - I^{(k)}(i-1, j)\right) \gg \text{shift1} \quad \text{(Eq. 1)}$$

$$\frac{\partial I^{(k)}}{\partial y}(i, j) = \left(I^{(k)}(i, j+1) - I^{(k)}(i, j-1)\right) \gg \text{shift1}$$

where $I^{(k)}(i, j)$ is the sample value at coordinate (i, j) of the prediction signal in list k, k=0, 1, and the parameter shift1 is calculated based on a luma bit depth, bitDepth. In an example, shift1=max(6, bitDepth−6). In some examples, shift 1 is equal to a maximum of 2 and (14−bitDepth). In an example, calculations in Eq. 1 can be adapted to calculations in Eqs. 2-3.

$$\frac{\partial I^{(k)}}{\partial x}(i, j) = \left(\left(I^{(k)}(i+1, j) \gg \text{shift1}\right)\left(I^{(k)}(i-1, j) \gg \text{shift1}\right)\right) \quad \text{(Eq. 2)}$$

$$\frac{\partial I^{(k)}}{\partial x}(i, j) = \left(\left(I^{(k)}(i, j+1) \gg \text{shift1}\right)\left(I^{(k)}(i, j-1) \gg \text{shift1}\right)\right) \quad \text{(Eq. 3)}$$

In an example, auto-correlations and cross-correlations of gradients, $S_1$, $S_2$, $S_3$, $S_5$ and $S_6$, are calculated as below.

$$S_1 = \sum_{(i,j) \in \Omega} \psi_x(i, j) \cdot \psi_x(i, j), \quad \text{(Eq. 4)}$$

-continued $$S_3 = \sum_{(i,j)\in\Omega} \theta(i,j)\cdot\psi_x(i,j)$$

$$S_2 = \sum_{(i,j)\in\Omega} \psi_x(i,j)\cdot\psi_y(i,j)$$

$$S_5 = \sum_{(i,j)\in\Omega} \psi_y(i,j)\cdot\psi_y(i,j)$$

$$S_6 = \sum_{(i,j)\in\Omega} \theta(i,j)\cdot\psi_y(i,j)$$

where $$\psi_x(i,j) = \left(\frac{\partial I^{(1)}}{\partial x}(i,j) + \frac{\partial I^{(0)}}{\partial x}(i,j)\right) \gg n_a \quad \text{(Eq. 5)}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

and $\Omega$ is a 6×6 window (e.g., (940)) around the 4×4 subblock (e.g., the subblock (920)), and the values $n_a$ and $n_b$ are set equal to min(5, bitDepth−7) and min(8, bitDepth−4), respectively.

In an example, the auto-correlations and cross-correlations of gradients, $S_1$, $S_2$, $S_3$, $S_5$ and $S_6$, are calculated as below using Eq. 6.

$$S_1 = \Sigma_{(i,j)\in\Omega}\text{Abs}(\psi_x(i,j)), S_3 = \Sigma_{(i,j)\in\Omega}\theta(i,j)\cdot\text{Sign}(\psi_x(i,j))$$

$$S_2 = \Sigma_{(i,j)\in\Omega}\psi_x(i,j)\cdot\text{Sign}(\psi_y(i,j))$$

$$S_5 = \Sigma_{(i,j)\in\Omega}\text{Abs}(\psi_y(i,j)), S_6 = \Sigma_{(i,j)\in\Omega}\theta(i,j)\cdot\text{Sign}(\psi_y(i,j)) \quad \text{(Eq. 6)}$$

where $\Omega$ is a 6×6 window (e.g., (940)) around the 4×4 subblock (e.g., the subblock (920)), and the values $n_a$ and $n_b$ are set equal to min(1, bitDepth−11) and min(4, bitDepth−8), respectively.

The motion refinement or MVR ($\Delta mv_x$, $\Delta mv_y$) can be derived using the auto-correlations and cross-correlations using the following.

$$\Delta mv_x = S_1 > 0 ? \text{clip3}(-th'_{BIO}, th'_{BIO}, -((S_3 \cdot 2^{n_b-n_a}) \gg \lfloor \log_2 S_1 \rfloor)) : 0 \quad \text{(Eq. 7)}$$

$$\Delta mv_y = S_5 > 0 ? \text{clip3}(-th'_{BIO}, th'_{BIO}, \quad \text{(Eq. 8)}$$
$$-((S_6 \cdot 2^{n_b-n_a} - ((v_x S_{2,m}) \ll n_{S_2} + v_x S_{2,s})/2) \gg \lfloor \log_2 S_5 \rfloor)) : 0$$

where $$S_{2,m} = S_2 \gg n_{S_2}, S_{2,s} = S_2 \& (2^{n_{S_2}} - 1),$$

$\lfloor \cdot \rfloor$ is the floor function, and $n_{S_2}=12$. In an example, $th'_{BIO}=2^{max(5, BD-7)}$. In an example, $th'_{BIO}=2^{13-BD}$.

Based on the motion refinement and the gradients, the following adjustment (or prediction refinement) b(x, y) can be calculated for each sample in the 4×4 subblock:

$$b(x,y) = rnd\left(\frac{\left(\Delta mv_x\left(\frac{\partial I^{(1)}(x,y)}{\partial x} - \frac{\partial I^{(0)}(x,y)}{\partial x}\right) + \Delta mv_y\left(\frac{\partial I^{(1)}(x,y)}{\partial y} - \frac{\partial I^{(0)}(x,y)}{\partial y}\right) + 1\right)}{(2)}\right) \quad \text{(Eq. 9)}$$

In an example, the above calculations in Eq. 9 can be adapted to the following calculations in Eq. 10.

$$b(x,y) = rnd\left(\left(\Delta mv_x\left(\frac{\partial I^{(1)}(x,y)}{\partial x} - \frac{\partial I^{(0)}(x,y)}{\partial x}\right)\right)/2\right) + rnd\left(\left(\Delta mv_y\left(\frac{\partial I^{(1)}(x,y)}{\partial y} - \frac{\partial I^{(0)}(x,y)}{\partial y}\right)\right)/2\right) \quad \text{(Eq. 10)}$$

where the function 'rnd' represents a rounding operation.

The BDOF samples of the CU can be calculated by adjusting the bi-prediction samples as follows:

$$\text{pred}_{BDOF}(x,y) = (I^{(0)}(x,y) + I^{(1)}(x,y) + b(x,y) + o_{offset}) \gg \text{shift} \quad \text{(Eq. 11)}$$

In an embodiment, the values are selected such that multipliers in the BDOF process do not exceed 15-bit, and the maximum bit-width of the intermediate parameters in the BDOF process is kept within 32-bit.

Figure 9:
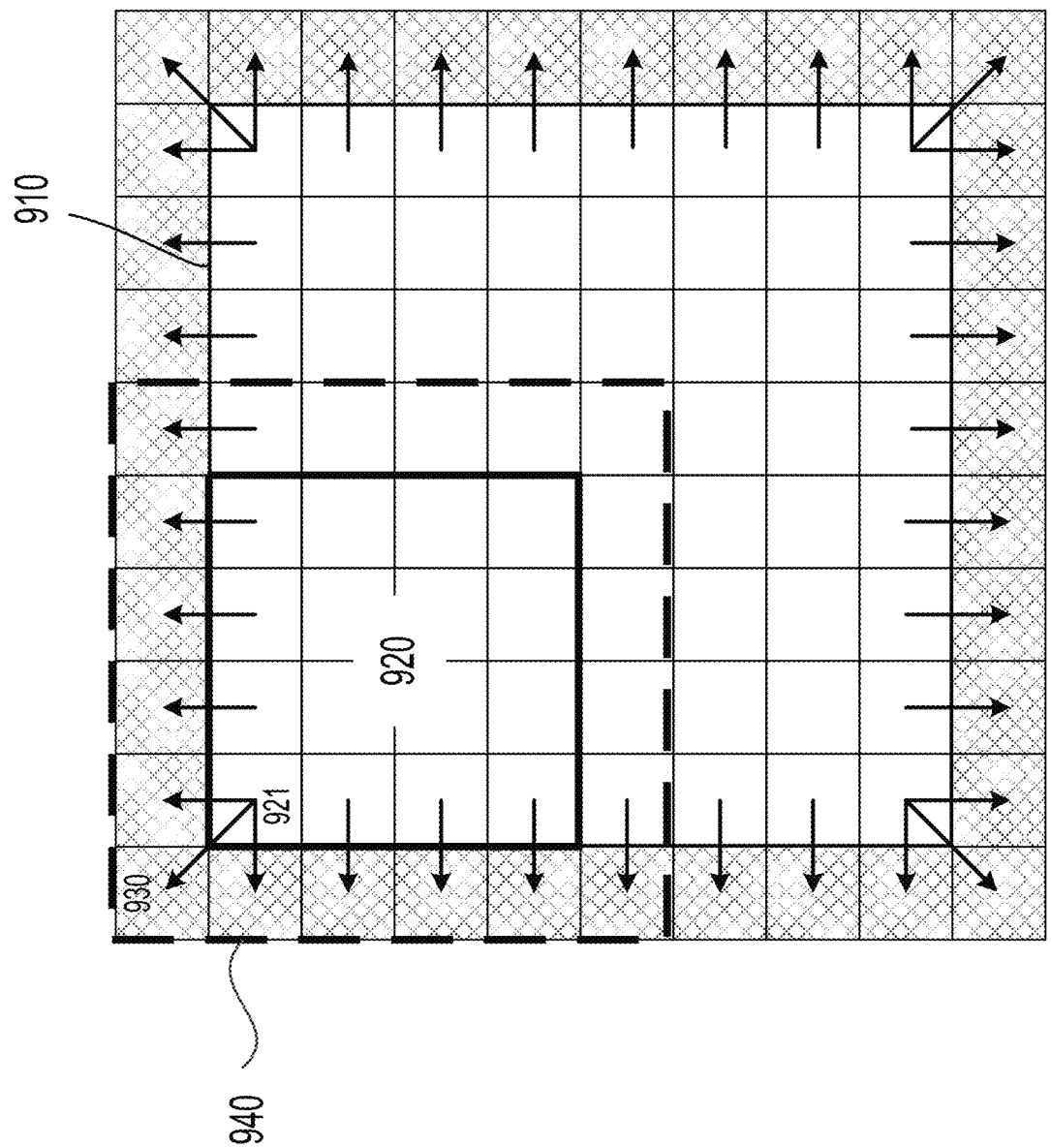
FIG. 9 shows an example of a bi-directional optical flow (BDOF) mode in accordance with one embodiment.

In an example, to derive the gradient values, prediction samples $I^{(k)}(i, j)$ in the list k (k=0, 1) that are outside the current CU boundaries are to be generated. Referring to FIG. 9, the BDOF (e.g., in VVC) can use an extended row/column around boundaries of a CU (910). In order to control a computational complexity of generating out-of-boundary prediction samples (e.g., a prediction for a sample (930) or a prediction sample (930)), prediction samples in the extended area (patterned areas in FIG. 9) can be generated by taking reference samples at nearby integer positions (e.g., using a floor operation on the coordinates) directly without interpolation. In an example, an 8-tap motion compensation interpolation filter (also referred to as an 8-tap interpolation filter) is used to generate prediction samples within the CU (910) (white positions). In an example shown in FIG. 9, the CU (910) includes 8×8 samples. In an example, the extended sample values are used in gradient calculations only. The gradient calculations can use Eq. 1 or Eqs. 2-3, as described above.

Referring to FIG. 9, for the remaining steps (e.g., Eqs. 4-6) in the BDOF process, if prediction sample(s) and gradient value(s) outside the CU boundaries are used, the prediction sample(s) and the gradient value(s) outside the CU boundaries can be padded (e.g., repeated) from corresponding nearest neighbors as indicated by arrows in FIG. 9. For example, the prediction sample and the gradient values at (930) can be padded from the corresponding prediction sample and the gradient values at (921).

According to an aspect of the disclosure, decoder side motion vector refinement (DMVR) can be used to improve/refine accuracy of MVs in a merge mode based on starting points.

Figure 10:
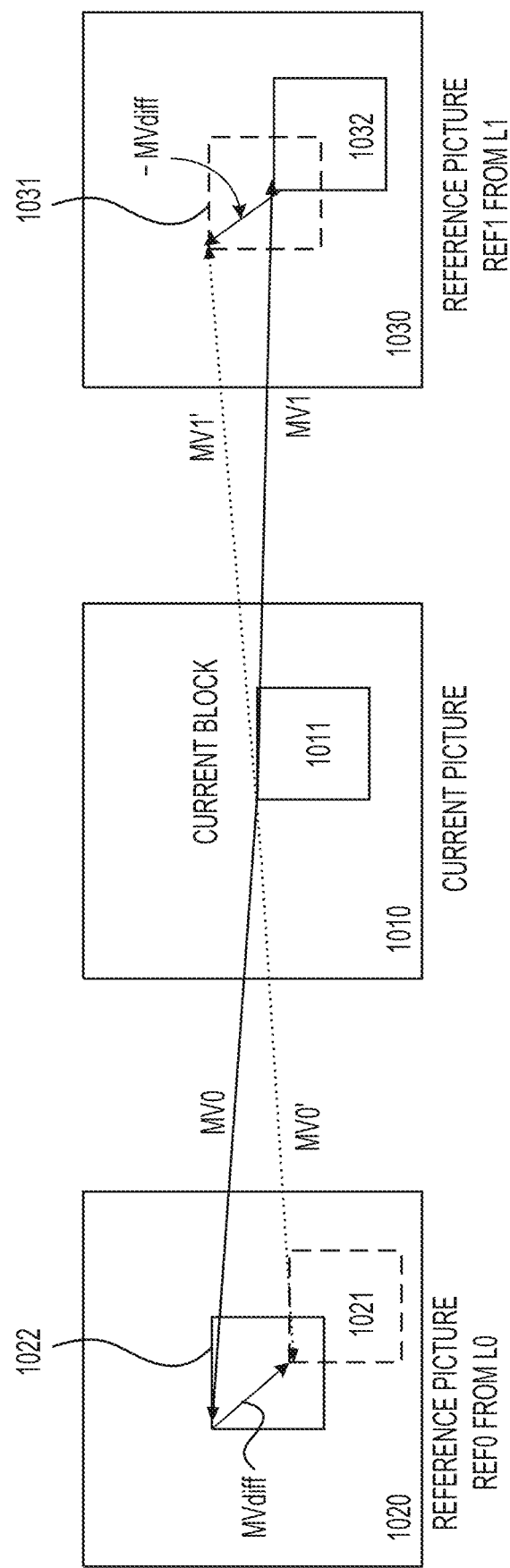
FIG. 10 shows an example of decoder-side motion vector refinement (DMVR) in accordance with one embodiment.

FIG. 10 shows an example of DMVR that is based on bilateral template matching. A current block (1011) is in a current picture (1010). Initial MVs (e.g., MV0 and MV1) refer to a reference block (1022) in a reference picture (1020) that is in a reference picture list L0 and a reference block (1032) in a reference picture (1030) that is in a reference picture list L1, respectively.

In some examples, a bilateral matching (BM) based DMVR can be applied to increase accuracy of the motion vectors of the merge mode. In bi-prediction operation, refined MV(s) can be searched around the initial MVs (e.g., MV0 and MV1) in the reference picture list L0 and the reference picture list L1, and results in refined reference blocks (or candidate blocks) (1021) and (1031), respectively. The bilateral matching method calculates the distortion based on the two candidate blocks (1021) and (1031) in the reference picture list L0 and list L1.

In an example, a sum of absolute differences (SAD) based on the candidate blocks (1021) and (1031) referenced by respective MV candidates (e.g., MV0' and MV1') that are around the initial MVs (e.g., MV0 and MV1) is calculated. The MV candidates with a lowest SAD can be the refined MV(s) and used to generate the bi-predicted signal.

A relationship between the initial MVs and the MV candidates can be described in Eqs. 12-13 as below.

$$MV0'=MV0+MV_{diff} \quad \text{(Eq. 12)}$$

$$MV1'=MV1-MV_{diff} \quad \text{(Eq. 13)}$$

where $MV_{diff}$ denotes the motion vector difference between a candidate MV and an initial MV in one of the reference pictures.

In some examples, the DMVR is applied for the CUs which are coded with certain mode requirements. For example, the mode requirements includes one or more of (1) the DMVR can be applied to CUs in CU level merge mode with bi-prediction MV; (2) MMVD mode is not used; (3) CIIP mode is not used; (4) one reference picture is in the past and another reference picture is in the future with respect to the current picture; (5) the distances (e.g., picture order count (POC) difference) from both reference pictures to the current picture are the same; and (6) the CU has at least 128 luma samples and CU width and height are more than or equal to 8 luma samples.

The refined MV(s) derived by a DMVR process can be used to generate the inter prediction samples and also used in temporal motion vector prediction for future pictures coding. While the original MV(s) (e.g., the initial MV(s)) can be used in a deblocking process and also used in spatial motion vector prediction for future CU coding.

In an embodiment, bi-prediction with weighted averaging (BWA) can be used in inter prediction. In an example (e.g., HEVC), a bi-prediction signal can be generated by averaging two prediction signals obtained from two different reference pictures and/or using two different motion vectors. The bi-prediction mode can be extended beyond simple averaging to allow weighted averaging of the two prediction signals, and thus can be referred to as generalized bi-prediction (GBi). An example of the bi-prediction BWA is shown below in Eq. 14. $P_0$ and $P_1$ are the two prediction signals, w is a weight, and $P_{bi-pred}$ is the weighted average.

$$P_{bi-pred}=((8-w)*P_0+w*P_1+4)>>3 \quad \text{(Eq. 14)}$$

Any suitable weight can be used in BWA. In an example, five weights are allowed in the weighted averaging bi-prediction, for example, $w \in \{-2, 3, 4, 5, 10\}$. For each bi-predicted CU, the weight w can be determined in one of two ways: (1) for a non-merged CU, the weight index can be signaled after a motion vector difference; (2) for a merged CU, the weight index can be inferred from neighboring blocks based on a merge candidate index. In an example, weighted averaging bi-prediction is only applied to CUs with 256 or more luma samples (e.g., CU width times CU height is greater than or equal to 256). For low-delay pictures, the five weights described above can be used. For non-low-delay pictures, three weights (e.g., $w \in \{3, 4, 5\}$) can be used.

Weighted prediction (WP) is a coding tool that can be used to efficiently code video content with fading. WP can allow weighting parameters (e.g., weight and offset) to be signaled for each reference picture in each of the reference picture lists L0 and L1. During motion compensation, the weight(s) and offset(s) of the corresponding reference picture(s) can be applied.

WP and BWA may be used for different types of video content. In some examples, interactions between WP and BWA may complicate a decoder design. Thus, if a CU uses WP, the BWA weight index may not be signaled, and the weight w can be inferred to be 4 (e.g., an equal weight is applied).

Exemplary conditions for applying the BDOF are described below. For the BDOF, both GBi and weighting flags of the explicit weighted prediction can be considered. FIG. 11 shows an exemplary set of conditions for applying the BDOF to a coding block (in Table 1).

In some examples, the DMVR can be applied to a block when a set of DMVR conditions (or conditions for applying the DMVR) are satisfied. In some examples, the set of DMVR conditions can include weighted prediction weighting factors (or weights). For example, for a block for which a BCW weight index or a GBi index is not "DEFAULT", equal weighting may not be used, and thus the DMVR is not performed. In an example, for a block where weighting flags of the explicit weighted prediction are not zero, the DMVR is not performed.

In FIG. 12, Table 2 shows an exemplary set of DMVR conditions for applying the DMVR and is referred to as a first set of DMVR conditions. The first set of DMVR conditions can be applied to a block and can be referred to as a first set of block-level DMVR conditions. For example, for the block, a condition (1210) is given below: if a flag (e.g., Merge_subblock_flag) indicates that a subblock-based merge mode is not used for the block (e.g., Merge_subblock_flag is equal to 0), the block may use the DMVR or the DMVR may be applied to the block. Otherwise, if the flag indicates that the subblock based merge mode is used for the block (e.g., Merge_subblock_flag is equal to 1), the block cannot use the DMVR or the DMVR is not applicable to the block. The subblock-based merge mode can refer to the affine merge mode, the SbTMVP mode, or any suitable merge mode that is subblock-based.

The set of DMVR conditions in Table 2 does not allow the DMVR to be applied to a block coded with a subblock-based merge mode.

According to aspects of the disclosure, when a block is coded in the SbTMVP mode, applying the DMVR to eligible subblocks in the block may improve coding performance. For example, the DMVR is applied conditionally to one or more of a plurality of subblocks in the block. Thus, the accuracy of subblock MVs can be improved and coding performance may be improved.

For a block coded with a subblock-based inter prediction mode, the DMVR can be applied to one or more of a plurality of subblocks in the block. The DMVR may not be allowed when the subblock-based inter prediction mode is of one or more certain mode types. For example, the DMVR may not be allowed for the affine prediction mode. The subblock-based inter prediction mode can be the SbTMVP mode. In an embodiment, whether the DMVR can be applied to one of the plurality of subblocks is determined based on at least a mode type of the subblock-based inter prediction mode.

In some examples, in addition to the mode type of the subblock-based merge mode, one or more additional conditions are checked to determine whether the DMVR can be applied for the one of the plurality of subblocks. The one or more additional conditions can include whether a pair of mirrored reference pictures for the block is available where the current picture is located between the pair of mirrored reference pictures. For example, the pair of mirrored reference pictures is at an equal distance from a current picture including the block, one of the pair is in the past and the other of the pair is in the future. The one or more additional conditions can also include whether the DMVR is disabled for a plurality of blocks that includes the block. A high level flag (e.g., a sequence level flag, a picture level flag, a slice level flag, a tile level flag, a tile group level flag) can be used to indicate whether the DMVR is disabled at a high level that is associated with the plurality of blocks. The high level can be a sequence level, a picture level, a slice level, a tile level, a tile group level, or the like, and thus the plurality of blocks can be included in a sequence, a picture, a slice, a tile, a tile group, or the like.

In an example, when the subblock-based inter prediction mode (e.g., the SbTMVP mode) is not the affine prediction mode (e.g., the affine merge mode), a set of DMVR conditions can be further checked for each subblock to determine whether the DMVR can be applied to the subblock. When the one of the plurality of subblocks satisfies the set of DMVR conditions, the DMVR can be applied to the one of the plurality of subblocks. Thus, the one of the plurality of subblocks may be reconstructed based on the subblock-based inter prediction mode and the DMVR.

In an example, whether the pair of mirrored reference pictures for the block is available is checked first. Subsequently, when the pair of mirrored reference pictures for the block is determined to be available, other conditions may further be examined. In an example, when the subblock-based inter prediction mode is the SbTMVP mode, the set of DMVR conditions can be further checked for each subblock to determine whether the DMVR can be applied to the subblock, as described above.

In an example, whether the DMVR is disabled at the high level is checked first. For example, if the high level flag (e.g., a picture level flag) indicates that the DMVR is disabled at the high level (e.g., a picture level), the DMVR is disabled for the plurality of blocks in the current picture, and thus the DMVR is disabled for the block. Otherwise, the DMVR is not disabled for the high level (or the plurality of blocks in the current picture). Subsequently, when the DMVR is determined as not disabled at the high level, other conditions may further be checked. The other conditions may include the mode type of the subblock-based inter prediction mode, whether the pair of mirrored reference pictures for the block is available, and/or whether each subblock satisfies the set of DMVR conditions.

According to aspects of the disclosure, the DMVR can be applied to a subset of a plurality of subblocks in a block or the plurality of subblocks based on a mode type of the subblock-based inter prediction mode that is used. For example, for the block coded with the subblock-based merge mode, the DMVR can be applied to the subset of the plurality of subblocks in the block or the plurality of subblocks. The subblock-based merge mode can be the SbTMVP mode. In an example, the subblock-based merge mode is not the affine merge mode.

According to aspects of the disclosure, prediction information of a block in a current picture can be decoded from a coded video bitstream. The prediction information can indicate a subblock-based merge mode for a plurality of subblocks in the block. Whether to apply the DMVR to one of the plurality of subblocks can be determined based on at least a mode type of the subblock-based merge mode. In response to the DMVR being determined to be applied to the one of the plurality of subblocks, the one of the plurality of subblocks can be reconstructed according to the subblock-based merge mode with the DMVR. In an example, the subblock-based merge mode is not the affine merge mode. In an example, the subblock-based merge mode is the SbTMVP mode.

According to aspects of the disclosure, the DMVR can be applied to the one of the plurality of subblocks based at least in part on the subblock-based merge mode being the SbTMVP. In an embodiment, the SbTMVP mode is allowed to be combined with the DMVR. Thus, the SbTMVP mode and the DMVR can be applied to the block.

FIG. 13 shows an exemplary set of block-level DMVR conditions (also referred to as a second set of block-level DMVR conditions) in Table 3. The second set of block-level DMVR conditions in Table 3 can be obtained by modifying the first set of block-level DMVR conditions shown in Table 2. The second set of block-level DMVR conditions in Table 3 shows that when the subblock-based merge mode is not the affine merge mode, the DMVR can be applied to the block. Thus, the SbTMVP mode and the DMVR can be applied to the block.

A difference between the first set of block-level DMVR conditions in Table 2 (FIG. 12) and the second set of block-level DMVR conditions in Table 3 (FIG. 13) is that the condition (1210) in Table 2 is replaced by a condition (1310) in Table 3. In the first set of block-level DMVR conditions, the DMVR is not applicable to a block coded with any subblock-based merge mode (e.g., the affine merge mode, the SbTMVP mode, or the like), as indicated by the condition (1210). Thus, in an example, the DMVR is not applicable to a subblock in the block. In the second set of block-level DMVR conditions, the condition (1310) indicates that if the block is coded with a certain mode type of subblock-based merge mode, the affine merge mode in this example, the DMVR may not be applicable. If the block is not coded with the affine merge mode, the DMVR may be applicable. Accordingly, if the block is coded with a subblock-based merge mode that is not the affine merge mode, the DMVR may be applicable. If the block is coded with the SbTMVP mode, the DMVR may be applicable, for example, when other conditions in Table 3 are satisfied.

In an embodiment, a subblock size (or a SbTMVP subblock size) of the plurality of subblocks in the block coded with the SbTMVP mode can be 16×16 luma samples. For example, the subblock size can be set to 16×16 luma samples. MVs of the plurality of subblocks can be derived as described above with reference to FIGS. 8A-8C with the subblock size being 16×16 luma samples.

The DMVR can be determined to be applied to the one of the plurality of subblocks based at least in part on the subblock-based merge mode being the SbTMVP and the subblock size being 16×16 luma samples.

Whether to apply the DMVR to the one of the plurality of subblocks in the block coded with the subblock-based merge mode can be determined based on a set of block-level DMVR conditions (e.g., the second set of block-level DMVR conditions in Table 3). In an example, as shown in Table 3, the set of block-level DMVR conditions can include that the affine merge mode is not used. The set of block-level DMVR conditions can indicate that the subblock-based merge mode used to code the block is not the affine merge mode. If the one of the plurality of subblocks satisfies the second set of block-level DMVR conditions in Table 3, the DMVR can be applied to the one of the plurality of subblocks coded with the SbTMVP. If the one of the plurality of subblocks does not satisfy the second set of block-level DMVR conditions in Table 3, the DMVR is not applicable to the one of the plurality of subblocks coded with the SbTMVP. In an example, the second set of block-level DMVR conditions in Table 3 is checked for each subblock to determine whether the DMVR can be applied to the subblock.

Certain conditions (e.g., the condition (1310)) in the second set of block-level DMVR conditions are common to the plurality of subblocks. Thus, if the one of the plurality of subblocks satisfies the certain conditions, remaining ones of the plurality of subblocks also satisfy the certain conditions, and thus only one subblock is to be checked for the certain conditions. In an example, one or more conditions (e.g., a condition (1320)) in the second set of block-level DMVR conditions are not common to the plurality of subblocks, and thus each subblock is to be checked for the one or more conditions. The condition (1320) refers to a reference picture 0 (e.g., indicated by refIdxL0) and a reference picture 1 (e.g., indicated by refIdxL1) of each subblock. The condition (1320) indicates that the reference picture 0 from a reference picture list 0 and the reference picture 1 from a reference picture list 1 are mirrored reference pictures for the subblock with respect to the current picture. A reference picture 0 and a reference picture 1 of a first subblock can be different from a reference picture 0 and a reference picture 1 of a second subblock.

In an embodiment, the block in the current picture can be associated with one or more reference picture lists. Whether the DMVR can be applied to the one of the plurality of subblocks can further be determined based on whether the one or more reference picture lists satisfy a plurality of conditions. The plurality of conditions can include that (a) the one or more reference picture lists for the block include a first reference picture list (e.g., a list 0 or L0) and a second reference picture list (e.g., a list 1 or L1), (b) the current picture is between a first reference picture in the first reference picture list and a second reference picture in the second reference picture list in a video sequence, and (c) a first temporal distance between the first reference picture and the current picture is equal to a second temporal distance between the second reference picture and the current picture. In an example, the DMVR may be enabled on the block coded with the SbTMVP mode when the two conditions (e.g., (b) and (c)) for the pair of reference pictures for the block are met. In some embodiments, the DMVR may be enabled on the block coded with the SbTMVP mode only when the two conditions for the pair of reference pictures for the block are met. The pair of reference pictures includes the first reference picture in the first reference picture list and the second reference picture in the second reference picture list. One of the two conditions is that the first reference picture and the second reference picture are in opposite directions relative to the current picture in a video sequence. For example the current picture is located between the first and second reference pictures. Thus, one (e.g., the first reference picture) of the pair of reference pictures is in the past and another one (e.g., the second reference picture) of the pair of reference pictures is in the future with respect to the current picture temporally. The video sequence includes the current picture, the first reference picture, and the second reference picture. Another one of the two conditions is that the first temporal distance (e.g., a first POC difference) between the first reference picture and the current picture is equal to the second temporal distance (e.g., a second POC difference) between the second reference picture and the current picture.

When the pair of reference pictures described above is available for the block (also referred to as the SbTMVP block) coded with the SbTMVP mode, the two conditions for the pair of reference pictures for the block are satisfied. Thus, the subblock size (or the SbTMVP subblock size) of the SbTMVP block can be 16×16 luma samples. In an example, the subblock size of the SbTMVP block can be set to 16×16 luma samples. For each subblock, the second block-level DMVR conditions in Table 3 can be further checked to determine whether the DMVR can be enabled on the subblock. The DMVR can be determined to be applied to the one of the plurality of subblocks when the one of the plurality of subblocks satisfies the second set of block-level DMVR conditions.

Otherwise, when the pair of reference pictures described above is not available for the SbTMVP block, the subblock size of the SbTMVP block can be set to 8×8 luma samples. In an example, the DMVR is not enabled, and the second set of block-level DMVR conditions is not checked for the plurality of subblocks.

When the pair of reference pictures is available for the SbTMVP block, the two conditions for the pair of reference pictures for the block are satisfied. Thus, a flag may be further signaled, for example, in the coded video bitstream, to indicate whether the subblock size of the SbTMVP block is 16×16 luma samples or 8×8 luma samples. In an example, the flag may be signaled to indicate whether the subblock size of the SbTMVP block is to be set to 16×16 luma samples or 8×8 luma samples. When the subblock size is signaled to be 16×16 luma samples, the second block-level DMVR conditions in Table 3 can be further checked for each subblock to determine whether the DMVR can be enabled on the subblock. The DMVR can be determined to be applied to the one of the plurality of subblocks based at least in part on the flag indicating that the subblock size is 16×16 luma samples. For example, when the flag indicates that the subblock size is 16×16 luma samples, the DMVR can be determined to be applied to the one of the plurality of subblocks when the one of the plurality of subblocks satisfies the second set of block-level DMVR conditions.

In an embodiment, up to two types (e.g., a first type and a second type) of SbTMVP candidate(s) (or SbTMVP merge candidate(s)) may be added into a subblock merge candidate list for the block. The first type of SbTMVP candidate(s) can be a SbTMVP candidate (or a SbTMVP merge candidate) without the DMVR enabled. The second type of SbTMVP candidate(s) can be a SbTMVP candidate (or a SbTMVP merge candidate) with the DMVR enabled. In an example, the subblock merge candidate list includes the second type of SbTMVP candidate(s), such as the SbTMVP candidate with the DMVR enabled.

A subblock size of the second type of SbTMVP candidate(s) may be identical to a subblock size of the first type of SbTMVP candidate(s). Alternatively, the subblock size (e.g., 16×16 luma samples) of the second type of SbTMVP candidate(s) may be different from the subblock size (e.g., 8×8 luma samples) of the first type of SbTMVP candidate(s).

The subblock merge candidate list for the block can include any suitable subblock merge candidates, such as SbTMVP candidate(s) (e.g., the first type, the second type), affine merge candidate(s) (e.g., inherited affine merge candidate(s)), and/or the like. A position of the second type of SbTMVP candidate(s) in the subblock merge candidate list may be right after the first type of SbTMVP candidate(s). Alternatively, the position of the second type of SbTMVP candidate(s) may be after the affine merge candidate(s) or after the inherited affine merge candidate(s). In some example, the second type of SbTMVP candidate(s) is only available when the condition (1320) in Table 3 is met.

The DMVR can be determined to be applied to the one of the plurality of subblocks based at least in part on the subblock size of each of the plurality of subblocks being 8×8 luma samples.

In an embodiment, the subblock size of the SbTMVP block is 8×8 luma samples. Each subblock can be checked with a set of subblock-level DMVR conditions in Table 4 (shown in FIG. 14) to determine whether the DMVR can be applied to the subblock. When the DMVR is determined to be applied to the subblock having the subblock size of 8×8 luma samples, the DMVR as described above with reference to FIG. 10 with a block size of 8×8 luma samples can be applied to the subblock.

The difference between the set of subblock-level DMVR conditions in Table 4 (FIG. 14) and the second block-level DMVR conditions in Table 3 (FIG. 13) is indicated by a condition (1330) in Table 3 and a condition (1430) in Table 4. In an example, the condition (1330) specifies a block width (e.g., the block width is greater than or equal to 8 samples), a block height (e.g., the block height is greater than or equal to 8 samples), and a number of samples in the block (e.g., the block width times the block height is greater than 128 samples). In an example, the condition (1430) specifies a subblock width (e.g., the subblock width is greater than or equal to 8 samples), a subblock height (e.g., the subblock height is greater than or equal to 8 samples), and a number of samples in each subblock (e.g., the subblock width times the subblock height is greater than 64 samples).

In an embodiment, a high level flag can be signaled at the high level, as described above. The high level can be a sequence level, a picture level, a slice level, a tile level, a tile Group level, or the like. In an example, the high level flag is referred to as a sub_block_refinement flag. Whether to apply the DMVR to blocks associated with the high level can be determined based on the high level flag signaled at the high level. The blocks associated with the high level can include the block coded with the subblock-based merge mode (e.g., the SbTMVP mode). In response to the high level flag indicating that the DMVR is not disabled for the blocks (or the DMVR may be enabled for the blocks), whether to apply the DMVR to the one of the plurality of subblocks in the block can be further determined based on at least one of (i) a set of DMVR conditions for the block (e.g., the second set of block-level DMVR conditions in Table 3, or the set of subblock-level DMVR conditions in Table 4) and (ii) availability of the pair of reference pictures for the block, as described above. In various examples, the set of DMVR conditions for the block indicates that the subblock-based merge mode is not the affine merge mode. For example, the set of DMVR conditions for the block includes that the affine merge mode is not used.

In an example, the high level flag indicates that the DMVR may be enabled for the block coded with the subblock-based merge mode (e.g., the SbTMVP mode), and the set of DMVR conditions for the block can be checked for each subblock. When the one of the plurality of subblocks satisfies the set of DMVR conditions, the DMVR can be applied to the one of the plurality of subblocks.

In an example, the high level flag indicates that the DMVR may be enabled for the block coded with the subblock-based merge mode (e.g., the SbTMVP mode), subsequently whether the pair of reference pictures for the block satisfies the two conditions as described above can be checked. When the two conditions described above are met, the set of DMVR conditions for the block can further be checked for each subblock. When the one of the plurality of subblocks satisfies the set of DMVR conditions, the DMVR can be applied to the one of the plurality of subblocks.

In an example, when the high level flag is true, the DMVR may be enabled for a subblock, as described above. In an example, only when the high level flag is true, the DMVR may be enabled for a subblock. In an example, the subblock is the one of the plurality of subblocks in the block coded with the SbTMVP mode. When the high level flag is false, the DMVR is disabled for the block, and thus the DMVR is disabled for the plurality of subblocks coded with the subblock-based merge mode (e.g., the SbTMVP mode, the affine merge mode).

Figure 15:
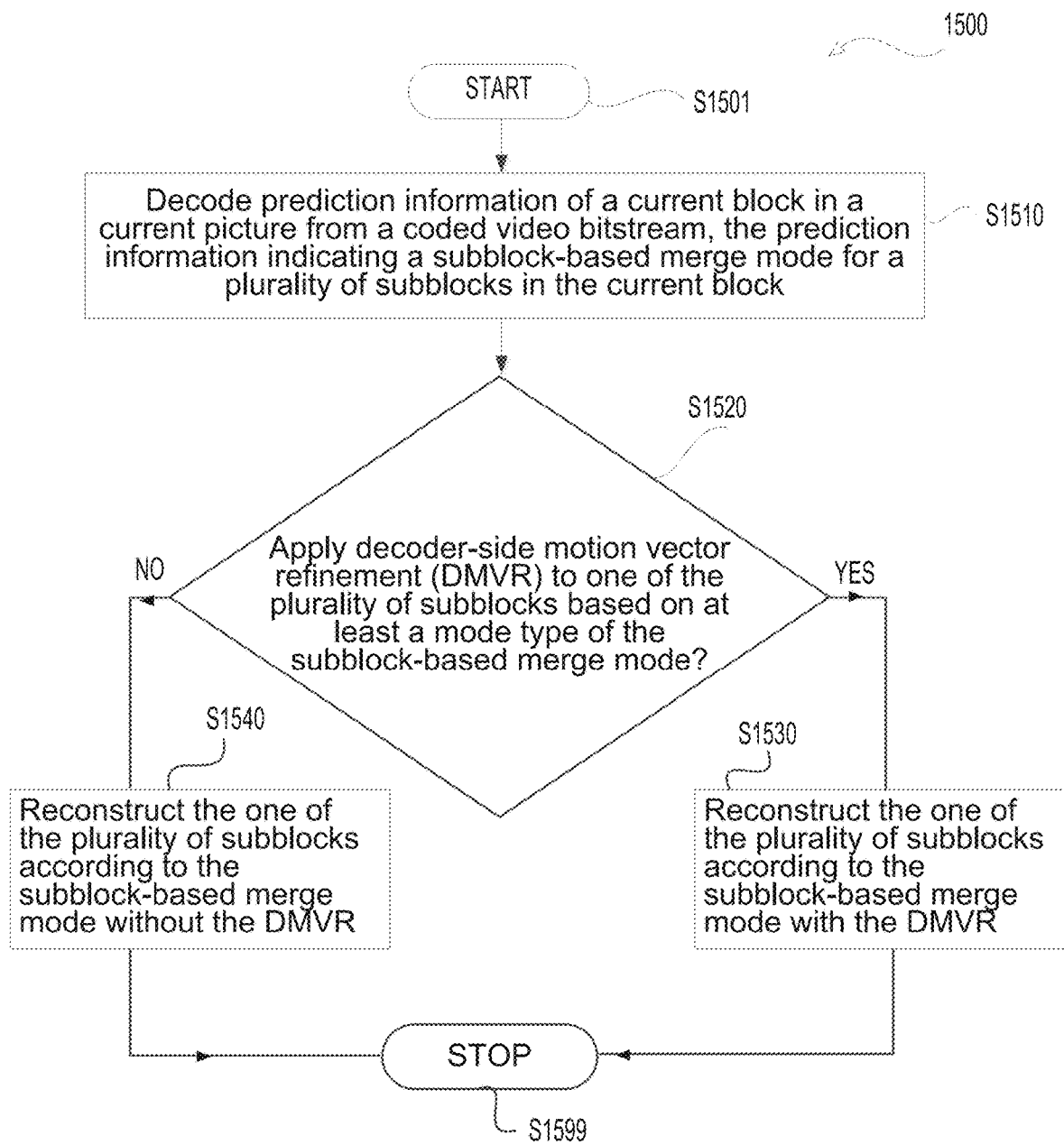
FIG. 15 shows a flow chart outlining a process (1500) according to an embodiment of the disclosure.

FIG. 15 shows a flow chart outlining a process (1500) according to an embodiment of the disclosure. The process (1500) can be used in the reconstruction of a block, so to generate a prediction block for the block under reconstruction. In various embodiments, the process (1500) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of the block in a current picture can be decoded from a coded video bitstream. The prediction information can indicate the subblock-based merge mode (e.g., the SbTMVP mode) for a plurality of subblocks in the block.

At (S1520), whether to apply the DMVR to one of the plurality of subblocks can be determined based on at least a mode type of the subblock-based merge mode, as described above.

In an example, the mode type with which the DMVR can be applied to the one of the plurality of subblocks is indicated in a set of DMVR conditions. The set of DMVR conditions can indicate that the subblock-based merge mode is not the affine merge mode in order to apply the DMVR. The set of DMVR conditions for the block can be checked for the one of the plurality of subblocks to determine whether the mode type is suitable for applying the DMVR. In an example, the subblock-based merge mode is SbTMVP. Thus the DMVR can be determined to be applied to the one of the plurality of subblocks.

The set of DMVR conditions can further include one or more additional conditions, such as (a) a geometric partitioning mode not being used; (b) a sequence level flag indicating that the DMVR is enabled in a sequence that includes the current block and a slice level flag indicating that the DMVR is not disabled in a slice that includes the current block; (c) the plurality of subblocks is coded using a bi-prediction mode; (d) a MMVD mode is not used; (e) equal weighting is used in the bi-prediction mode; (f) the current picture is between a first reference picture in a first reference picture list and a second reference picture in a second reference picture list and a first POC between the current picture and the first reference picture is identical to a second POC between the current picture and the second reference picture where the first reference picture, the first reference picture list, the second reference picture, and the second reference picture list are for the one of the plurality of subblocks; (g) sizes (e.g., widths, heights, and/or a number of samples) of the first reference picture, the second reference picture, and the current picture; and (h) sizes of the current block or the plurality of subblocks.

In some examples, in addition to the mode type of the subblock-based merge mode, the one or more additional conditions in the set of DMVR conditions are checked to determine whether the DMVR can be applied to the one of the plurality of subblocks.

The set of DMVR conditions for the block can be a set of block-level DMVR conditions (e.g., the second set of block-level DMVR conditions in Table 3), a set of subblock-level DMVR conditions (e.g., the set of subblock-level DMVR conditions in Table 4), or the like. In an example, the set of block-level DMVR conditions includes the sizes of the current block, as shown in Table 3. The set of subblock-level DMVR conditions includes the sizes of the plurality of subblocks, as shown in Table 4.

In an example, as described above, whether the two conditions for the pair of reference pictures for the block are met is checked prior to checking the set of DMVR conditions for the block. The pair of reference pictures for the block can be in the one or more reference picture lists for the block. In an example, the one or more reference picture lists for the block includes one reference picture list, and thus the pair of reference pictures is not available. Accordingly, the DMVR is not applicable to the block.

In an example, whether the high level flag indicates that the DMVR may be enabled for blocks associated with the high level may be checked prior to checking other conditions (e.g., the set of DMVR conditions and/or the two conditions for the pair of reference pictures). When the high level flag indicates that the DMVR may be enabled for blocks associated with the high level, one or more of the other conditions may be further checked, as described above, to determine whether the DMVR can be applied to the one of the plurality of subblocks in the block (e.g., coded with the subblock-based merge mode).

When the DMVR is determined to be applied to the one of the plurality of subblocks, the process (1500) proceeds to (S1530). Otherwise, the process (1500) proceeds to (S1540).

At (S1530), the one of the plurality of subblocks can be reconstructed according to the subblock-based merge mode with the DMVR. In an example, the subblock-based merge mode is not the affine merge mode. In an example, the subblock-based merge mode is the SbTMVP mode. The process (1500) proceeds to (S1599), and terminates.

At (S1540), the one of the plurality of subblocks can be reconstructed according to the subblock-based merge mode without the DMVR. The subblock-based merge mode can be the affine merge mode, the SbTMVP mode, or the like. The process (1500) proceeds to (S1599), and terminates.

The process (1500) can be suitably adapted to various scenarios and steps in the process (1500) can be adjusted accordingly. One or more of the steps in the process (1500) can be adapted, omitted, repeated, and/or combined. Any suitable order can be used to implement the process (1500). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
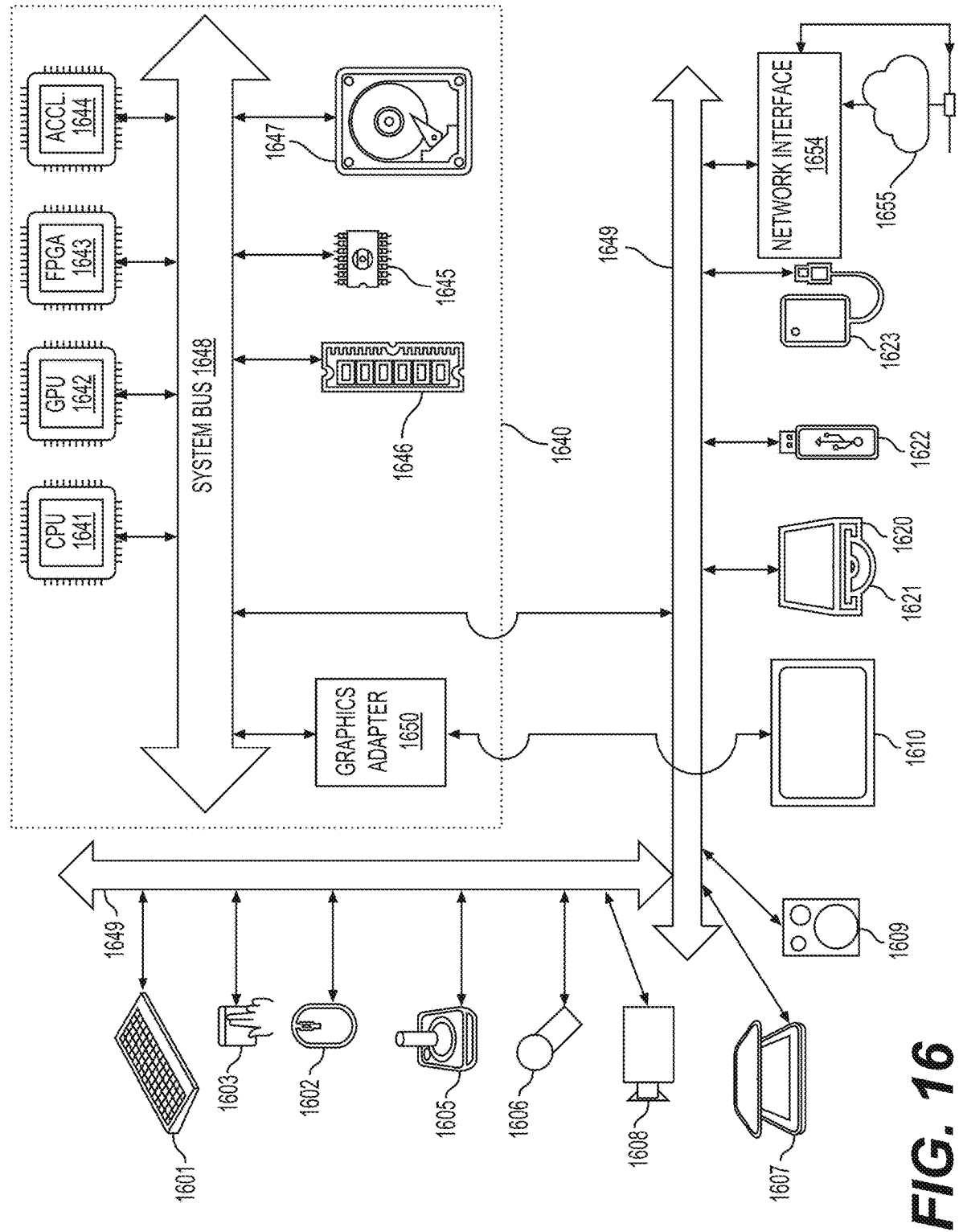
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapter (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, a display (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
AMVP: Advanced Motion Vector Prediction
JEM: Joint Exploration Model
VTM: Versatile Test Model
VVC: Versatile Video Coding
BMS: Benchmark Set
MV: Motion Vector
MVD: Motion vector difference
MVP: Motion Vector Prediction
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: Solid-State Drive
IC: Integrated Circuit
CU: Coding Unit
PU: Prediction Unit
HMVP: History-Based Motion Vector Prediction
MMVD: Merge With Motion Vector Difference
TMVP: Temporal Motion Vector Prediction
SbTMVP: Subblock-Based Temporal Motion Vector Prediction
BDOF: Bi-Directional Optical Flow
DMVR: Decoder-Side Motion Vector Refinement While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, comprising:
   determining a subblock-based merge mode used to code a current block in a current picture;
   partitioning the current block into a plurality of subblocks based on the subblock-based merge mode;
   determining whether decoder-side motion vector refinement (DMVR) is allowed for a plurality of blocks that includes the current block;
   in response to a determination that the DMVR is allowed for the plurality of blocks that includes the current block, determining that the DMVR is to be applied to a subblock of the plurality of subblocks in the current block based at least on the subblock-based merge mode being subblock-based temporal motion vector prediction (SbTMVP); and
   encoding (i) a high level flag indicating whether the DMVR is allowed for the plurality of blocks and (ii) information indicating the SbTMVP in a bitstream.

2. The method of claim 1, wherein the determining that the DMVR is to be applied comprises:
   determining that the DMVR is to be applied to the subblock of the plurality of subblocks based on the subblock-based merge mode being the SbTMVP and a subblock size of each of the plurality of subblocks being 16×16 luma samples.

3. The method of claim 1, wherein the determining that the DMVR is to be applied further comprises:
   determining whether one or more reference picture lists for the current block satisfy a plurality of conditions, the plurality of conditions including that (a) the one or more reference picture lists for the current block include a first reference picture list and a second reference picture list, (b) the current picture is between a first reference picture in the first reference picture list and a second reference picture in the second reference picture list in a video sequence, and (c) a first temporal distance between the first reference picture and the current picture is equal to a second temporal distance between the second reference picture and the current picture; and
   determining that the DMVR is to be applied to the subblock of the plurality of subblocks further based on the one or more reference picture lists for the current block satisfying the plurality of conditions.

4. The method of claim 3, wherein
   the one or more reference picture lists for the current block satisfy the plurality of conditions; and
   a subblock size of each of the plurality of subblocks is 16×16 luma samples.

5. The method of claim 3, wherein
   the one or more reference picture lists for the current block satisfy the plurality of conditions;
   the method further includes determining whether a subblock size of each of the plurality of subblocks is 16×16 luma samples;
   the determining that the DMVR is to be applied includes determining that the DMVR is to be applied to the subblock of the plurality of subblocks further in response to the subblock size being 16×16 luma samples; and
   encoding a flag that indicates whether the subblock size of each of the plurality of subblocks is 16×16 luma samples.

6. The method of claim 3, wherein a subblock merge candidate list includes a SbTMVP candidate with the DMVR enabled.

7. The method of claim 1, wherein the determining that the DMVR is to be applied comprises:
   determining that the DMVR is to be applied to the subblock of the plurality of subblocks further based on a subblock size of each of the plurality of subblocks being 8×8 luma samples.

8. An apparatus for video encoding, comprising:
   processing circuitry configured to:
      determine a subblock-based merge mode used to code a current block in a current picture;
      partition the current block into a plurality of subblocks based on the subblock-based merge mode;
      determining whether decoder-side motion vector refinement (DMVR) is allowed for a plurality of blocks that includes the current block;
      in response to a determination that the DMVR is allowed for the plurality of blocks that includes the current block, determine that the DMVR is to be applied to a subblock of the plurality of subblocks in the current block based on the subblock-based merge mode being subblock-based temporal motion vector prediction (SbTMVP); and
      encode (i) a high level flag indicating whether the DMVR is allowed for the plurality of blocks and (ii) information indicating the SbTMVP in a bitstream.

9. The apparatus of claim 8, wherein the processing circuitry is configured to:
   determine that the DMVR is to be applied to the subblock of the plurality of subblocks based on the subblock-based merge mode being the SbTMVP and a subblock size of each of the plurality of subblocks being 16×16 luma samples.

10. The apparatus of claim 8, wherein the processing circuitry is configured to:
   determine whether one or more reference picture lists for the current block satisfy a plurality of conditions, the plurality of conditions including that (a) the one or more reference picture lists for the current block include a first reference picture list and a second reference picture list, (b) the current picture is between a first reference picture in the first reference picture list and a second reference picture in the second reference picture list in a video sequence, and (c) a first temporal distance between the first reference picture and the current picture is equal to a second temporal distance between the second reference picture and the current picture; and
   determine that the DMVR is to be applied to the subblock of the plurality of subblocks further based on the one or more reference picture lists for the current block satisfying the plurality of conditions.

11. The apparatus of claim 10, wherein
   the one or more reference picture lists for the current block satisfy the plurality of conditions; and
   a subblock size of each of the plurality of subblocks is 16×16 luma samples.

12. The apparatus of claim 10, wherein a subblock merge candidate list includes a SbTMVP candidate with the DMVR enabled.

13. The apparatus of claim 8, wherein the processing circuitry is configured to:
   determine that the DMVR is to be applied to the subblock of the plurality of subblocks further based on a subblock size of each of the plurality of subblocks being 8×8 luma samples.

14. A non-transitory computer-readable storage medium storing a program executable by at least one processor to perform:
   determining a subblock-based merge mode used to code a current block in a current picture;
   partitioning the current block into a plurality of subblocks based on the subblock-based merge mode;
   determining whether decoder-side motion vector refinement (DMVR) is allowed for a plurality of blocks that includes the current block;
   in response to a determination that the DMVR is allowed for the plurality of blocks that includes the current block, determining that the DMVR is to be applied to a subblock of the plurality of subblocks in the current block based at least on the subblock-based merge mode being subblock-based temporal motion vector prediction (SbTMVP); and
   encoding (i) a high level flag indicating whether the DMVR is allowed for the plurality of blocks and (ii) information indicating the SbTMVP in a bitstream.

* * * * *